(12) United States Patent
Schofield

(10) Patent No.: US 7,492,932 B2
(45) Date of Patent: Feb. 17, 2009

(54) METHOD AND APPARATUS FOR PROCESSING MEDICAL IMAGE DATA IN A NETWORK ENVIRONMENT

(75) Inventor: Bruce Schofield, Tyngsboro, MA (US)

(73) Assignee: Nortel Networks Ltd., St. Laurent, Quebec (CA)

( * ) Notice: Subject to any disclaimer, the term of this patent is extended or adjusted under 35 U.S.C. 154(b) by 508 days.

(21) Appl. No.: 10/794,104

(22) Filed: Mar. 5, 2004

(65) Prior Publication Data

US 2005/0196025 A1 Sep. 8, 2005

(51) Int. Cl.
*G06K 9/00* (2006.01)

(52) U.S. Cl. .......................... 382/128; 716/16; 375/240

(58) Field of Classification Search .................. 382/128
See application file for complete search history.

(56) References Cited

U.S. PATENT DOCUMENTS

| | | | | |
|---|---|---|---|---|
| 5,684,621 | A * | 11/1997 | Downing | 359/326 |
| 5,956,172 | A * | 9/1999 | Downing | 359/326 |
| 6,064,423 | A * | 5/2000 | Geng | 348/36 |
| 6,177,913 | B1 * | 1/2001 | Whitesell | 345/6 |
| 6,208,318 | B1 * | 3/2001 | Anderson et al. | 345/1.1 |
| 6,327,074 | B1 * | 12/2001 | Bass et al. | 359/326 |
| 6,348,793 | B1 * | 2/2002 | Balloni et al. | 324/309 |
| 6,466,184 | B1 * | 10/2002 | Whitesell et al. | 345/6 |
| 6,470,071 | B1 * | 10/2002 | Baertsch et al. | 378/62 |
| 2001/0041991 | A1 * | 11/2001 | Segal et al. | 705/3 |
| 2002/0006216 | A1 * | 1/2002 | Armato et al. | 382/131 |
| 2002/0029264 | A1 * | 3/2002 | Ogino et al. | 709/223 |
| 2002/0067467 | A1 * | 6/2002 | Dorval et al. | 353/10 |
| 2003/0126148 | A1 * | 7/2003 | Gropper et al. | 707/100 |
| 2003/0165262 | A1 | 9/2003 | Nishikawa et al. | |

OTHER PUBLICATIONS

R. Hollebeek, *Digital Radiology on NGI WANs, NSCP/NDMA*, University of Pennsylvania, US-UK Workshop on Grid Computing, Aug. 4, 2001. (37 pages).
*Design Considerations for Medical Image Archive System*, (26 pages).
CommsDesign, *FPGA Architecture Ups Intrusion Detection Performance*, Oct. 2003 (10 pages).

(Continued)

*Primary Examiner*—Vikkram Bali
*Assistant Examiner*—David P Rashid
(74) *Attorney, Agent, or Firm*—Anderson, Gorecki & Manaras LLP

(57) ABSTRACT

A network image fusion service is provided that is configured to receive a plurality of image data and to execute at least one image fusion processes in both software and hardware. The image fusion process logic has been divided between instructions to be executed in software and logic to be executed in hardware. The software instructions may be executed by a processor within the network element or in a processor associated with network service. The hardware logic is executed in a reconfigurable programmable logic device such as an FPGA. The network service may be included within the network element, be separate from a network element but associated therewith, or may be external to the network and accessible by a plurality of network elements.

5 Claims, 4 Drawing Sheets

OTHER PUBLICATIONS

Frost & Sullivan, Enabling Picture Archiving Communicaitons System with EMC Automated Networked Storage Solutions, 2003, (7 pages).

Enterasys Networks, *St. John's Hospital Premium Health Care through Enterasys Solutions*, (2 pages).

PC Consultant Group, Inc. PACS&RIS, A practical outline, (4 pages).

White Paper Series, No. 6, version 2, *The DICOM Messaging Implementation of the CMS System*, Feb. 2003 (4 pages).

* cited by examiner

METHOD AND APPARATUS FOR PROCESSING MEDICAL IMAGE DATA IN A NETWORK ENVIRONMENT

BACKGROUND OF THE INVENTION

1. Field of the Invention

This invention generally relates to image processing systems and in particular to a method and apparatus for processing medical image data in a network environment.

2. Description of the Related Art

Medical diagnostic imaging allows radiologists to perform diagnosis of many types of injury and disease by imaging various internal body parts. For example, radiologists utilize diagnostic imaging to visualize organs in the abdomen, the chest cavity, the brain and central nervous system, the musculoskeletal system, and other body parts. Diagnostic imaging may be used to detect potential cancer abnormalities; bone densitometry; joint, bone, or soft tissue injuries; and many other types of diseases. Presently, diagnostic imaging includes many different imaging modalities such as x-rays, ultrasound, computed tomography, magnetic resonance imaging, and nuclear medicine to name but a few.

Traditionally, almost all diagnostic imaging was film based. An image was recorded on a physical piece of film that had to be developed, provided to the physician for viewing, reviewed by the physician, and recorded and stored in an archive. Often there was a significant time delay between the taking of the image and the physician reviewing the image. In addition, the storage of film images required a large physical space and associated record keeping. If a physician needed to refer to a patient's stored records, the film images needed to be physically found, retrieved, and provided to the physician. Often there was a significant time delay in this process as well.

To address these issues, diagnostic imaging technology has advanced and medical diagnostic imaging has shifted from a film based system to a digitally based system in which diagnostic images are recorded, transferred, viewed, and stored electronically. Several types of digital imaging modalities, such as computed tomography or magnetic resonance imaging generate a large number of images during each diagnostic examination that are then combined to form a three-dimensional volume image. One examination can generate between twenty and one hundred images or more. The processing of the large number of image files to render a single fused image is time consuming, so that a technician typically performs the image fusion prior to the fused image being provided to the radiologist for review. In some instances, the image formed by the technician is not exactly what the radiologist needed and the determination is made that other images are necessary. The time delay between taking the image and the review by the doctor or radiologist may thus be considerable. Thus, the patient may be required to return at a later time for more images to be taken, or the patient may be required to wait until the radiologist has reviewed the images and made a determination as to whether more images are needed. In either case, the patient is required to be subjected to further inconvenience.

SUMMARY OF THE INVENTION

A method and apparatus for the processing medical image data in a network environment is provided to reduce the amount of time required to process images for example to combine or fuse a plurality of image data into a single image data. According to an embodiment of the present invention, a network service is provided that is configured to receive a plurality of image data and to execute one or more image fusion processes in both software and hardware. The logic for each image fusion process may be divided between instructions that are to be executed in software and logic that is to be executed in hardware. The software instructions may be executed either by a processor within the network element or in a processor associated with network service. The hardware logic is executed in a reconfigurable programmable logic device such as a Field Programmable Gate Array (FPGA). The network service may be included within the network element, be separate from a network element but associated therewith, for example, as a blade server, or may be external to the network and accessible by a plurality of network elements. The process logic and hardware parameters may be stored with the network service components or may be stored external to the network as well.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
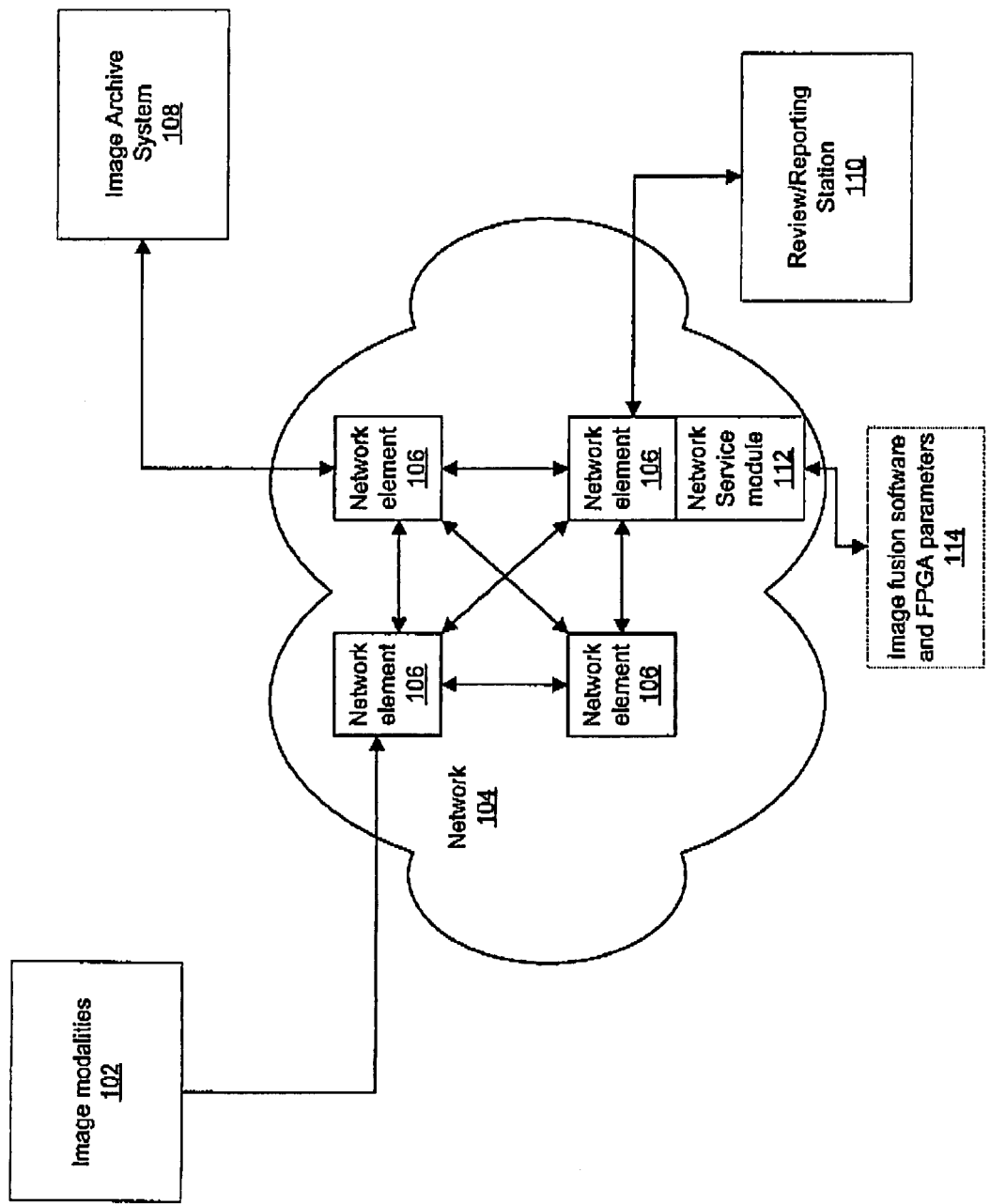
FIG. 1 is a functional block diagram of a network environment incorporating an embodiment of the present invention.

The following detailed description sets forth numerous specific details to provide a thorough understanding of the invention. However, those skilled in the art will appreciate that the invention may be practiced without these specific details. In other instances, well-known methods, procedures, components, protocols, processes, and circuits have not been describe in detail so as not to obscure the invention.

As described in greater detail below, a method and apparatus is provided for processing medical images in a network environment to form image data from a plurality of image data files in conjunction with the transmission of the plurality of image data files across a network. in one embodiment of the invention, a network service is provided and configured to execute a first portion of an image fusion process in software and to execute a second portion of the image fusion process in a reconfigurable and reprogrammable hardware device, such as a Field Programmable Gate Array (FPGA). The division of the process logic between software and hardware is a function of the type of process step, the level of complexity of the process step, the speed of the processor used to execute software instructions, the desirability of providing for future upgrades, and other system requirements with respect to speed and memory storage.

According to an embodiment of the present invention, the network image fusion service is provided in conjunction with a network element that is configured to receive a plurality of medical image data, retrieve the process software instructions and the hardware logic files for at least one image fusion process, execute the image fusion process both in software instructions and in hardware logic and to provide the desired fused image as an output. In the event that there is more than one image fusion process to be executed, the network service executes the plurality of image fusion processes in a predetermined order that may be a stored value or set by an operator. By dividing the execution of the image fusion process logic between software code and hardware logic, and executing these on the network with a network service in conjunction with a network element, the present invention described herein is able to shift responsibility for the image fusion processing from medical equipment used to display the images or an image archive system, to the network service. This allows a user to request a particular image and to receive the image in a shorter period of time than images formed using only software implemented processes or images processed by the reviewing/reporting workstation or image archive system.

Although one aspect of the present invention described herein is directed toward a network service configured to fuse multiple medical images into a single medical image, the invention described is not limited in this manner as other forms of image processing may be done as well, such as edge detection, filtering, morphing, and other types of medical image processing.

In the embodiments that follow, the network image fusion service is described as being used in conjunction with a network which may be, for example, an enterprise network that may be deployed in a medical facility or other facility. Examples of typical networks may include a radiological information system (RIS) or a hospital information system (HIS). However, the network may also be a more extensive network such as a wide area network (WAN), a metro area network (MAN), or a public network such as the Internet.

As used herein, image data means the pixel data and other data that are used to render a single image and a plurality of image data means pixel data and other data representative of a plurality of images that may be combined to create one or more combined images. Image data for a single image and a plurality of image data representing a plurality of images may be stored in one or more image data files depending on the system configuration and requirements. Also as used herein, hardware logic files may include without limitation, scripts, setup files, tool lineup files, and other such files that implement the process logic in a reprogrammable device such as an FPGA.

As depicted in FIG. 1, one or more imaging modalities 102 are configured to generate two or more image data that are to be fused into a single image data. The imaging modalities may include, without limitation, an x-ray system, a computer tomography system, an ultrasound system, a magnetic resonance imaging system, or a nuclear medicine system. Other modalities may similarly be used and the invention is not limited to these particular modalities. The image modalities 102 transfer the image data to a desired destination for storage, processing, or display via a network 104 that is made up of one or more network elements 106.

The image data provided by the image modalities 102 can be provided to an image archive system 108 for storage or to a reviewing/reporting workstation 110 for display to be reviewed by a radiologist. According to an embodiment of the present invention, an image fusion network service is deployed on the network to provide the image fusion of medical files transferred over the network 104. A network image fusion service module 112 that provides the network image fusion service functionality may be located, for example, on one or more of the network elements 106 configured to communicate on the network.

In the embodiments described herein the network image fusion module 112 is associated with a network element 106 that is configured to form a part of the network 104 described above. For example and without limitation, the network element 106 may be a router, bridge, gateway, content switch, or other type of network device, capable of hosting the network image fusion service. Alternatively, as will be explained in more detail below, the network image fusion module may be a blade server that is provided with an interface to the associated network element 106, but that has its own processor, memory, and reconfigurable reprogrammable logic device, e.g., a FPGA, and is capable of executing both the software instructions and the FPGA logic.

Figure 2:
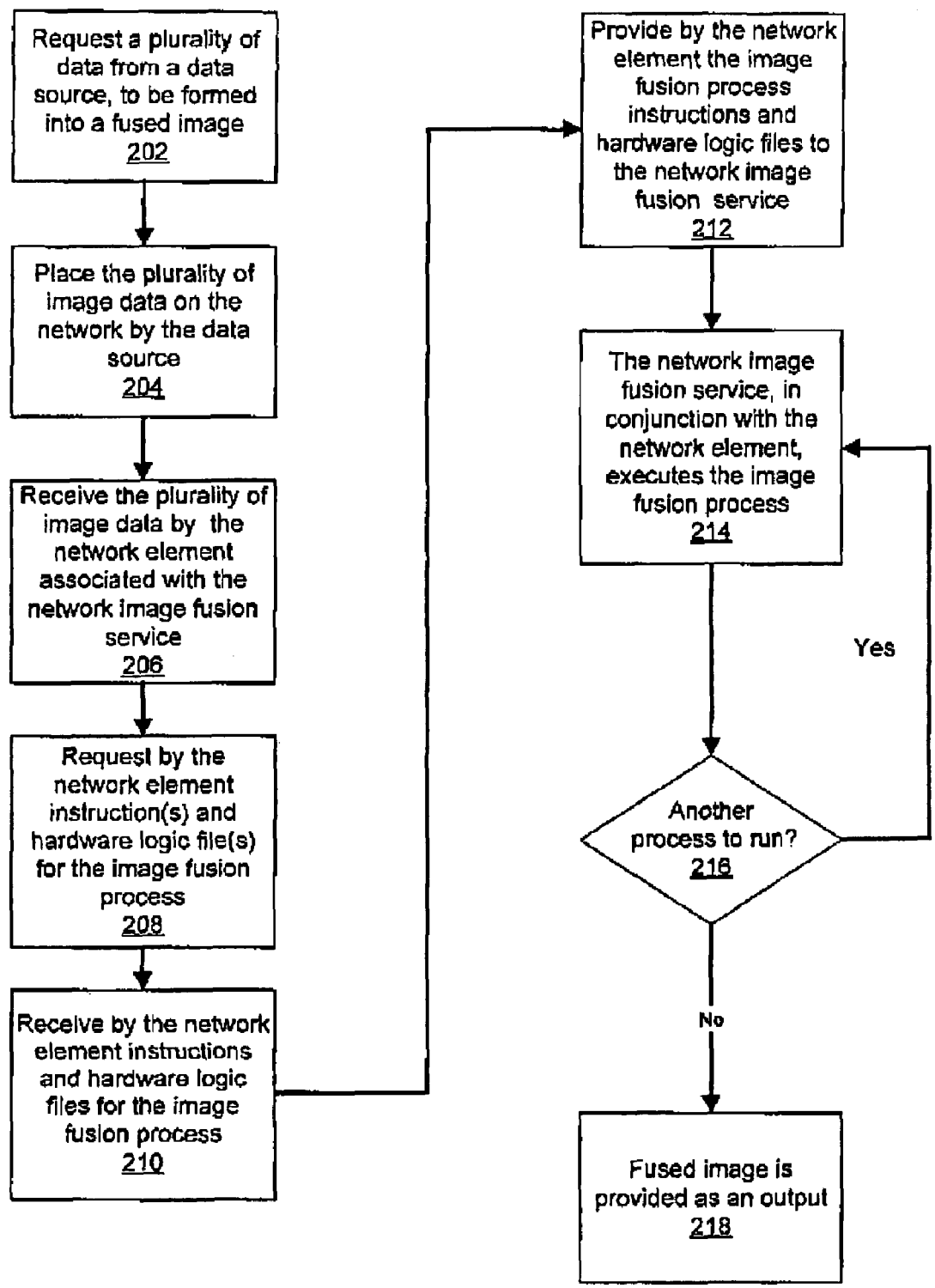
FIG. 2 is a flow chart illustrating a process according to an embodiment of the present invention.

FIG. 2 is a flow chart that depicts a process for performing real time image fusion according to an embodiment of the invention. Initially, a request for an image created from a plurality of image data supplied by a data source is generated (202). Optionally, the request may be accompanied by a desired order of execution of one or more image fusion processes. The data source may be an image archive system or an imaging modality. The data source provides the plurality of image data and places the plurality of image data on the network (204). The plurality of image data are received by the network element associated with the real time image fusion service (206). The network service in conjunction with the network element requests the software instructions and hardware logic files, e.g., the FPGA parameters, for each of the real time image fusion process from a storage location (208). The storage location provides the software instruction and the hardware logic files for the requested process (210). The network element receives the software instruction and the hardware logic files for the requested process and provides these to the network image fusion service (212). The network image fusion service, in conjunction with the network element, loads and executes the software instructions and the hardware logic files in the reprogrammable hardware for the image fusion process (214). If another process is to be run, (216), the network image fusion service, in conjunction with the network element, loads and executes the software instructions and the hardware logic files in the reprogrammable hardware for the image fusion process to be executed (214). If no more processes are to be run, the fused image data on the network (218).

In the event that there is more than one image fusion process, the real time fusion service storage location may provide the software instructions and hardware logic files for each process individually, in which case the process iterates through process steps (208) to (214) for each process. Alternatively, if there is more than one image fusion process, the storage location may provide the software instructions and the hardware logic files for all processes at the same time. In this event, the real time image fusion service stores the software instructions and hardware logic files and iterates at step (214) until all the processes have been executed thereby.

Figure 3:
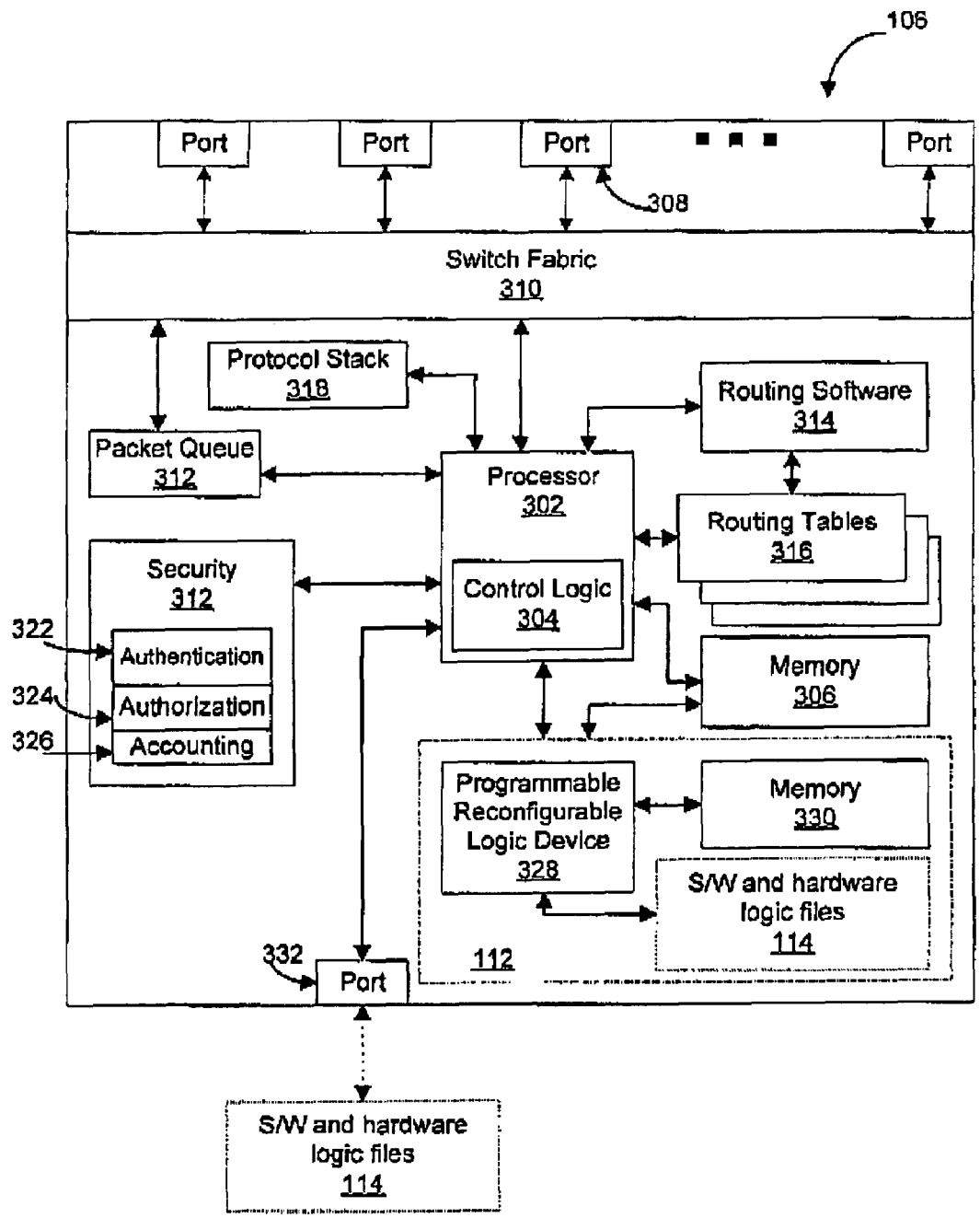
FIG. 3 is a functional block diagram of a network element according to an embodiment of the invention located.

FIG. 3 depicts a network element 106 according to an embodiment of the present invention. In particular, the network element generally includes a processor 302, which includes control logic 304, and a memory 306. The processor 302, control logic 304 and memory 306 provide the functionality and control of the network element 106. The network element 106 also includes one or more network data ports 308 that enable the network element 106 to be connected to the network 104. A switch fabric 310 under the control of the processor 302, is provided to interconnect the network data ports 308 and to direct packets between the network ports 308. The switch fabric 310 may be supported by a packet queue 312 that is configured to temporarily store packets or other protocol data units prior to transmission on the network 104 or before being processed by processor 302.

The network element 106 may also include one or more subsystems under the control of the processor 302 and control logic 304. For example, if the network element is configured to make routing decisions for data packets on the network, routing software 314 and routing tables 316 containing routing information may be provided to enable the network element to route data packets and other protocol data units on the network. Other subsystems may include for example a protocol subsystem that includes a protocol stack 318 that is configured to store data and logic to enable the network element to participate in protocol exchanges on the network. The network element 106 may also include a security subsystem 320 that may include an authentication module 322 that is configured to store authentication information to authenticate users, devices, network connections, or a combination thereof. The security subsystem 320 may further include an authorization module 324 that is configured to provide authorization information to prevent unauthorized access to the network, the network element, or both. The security subsystem 320 may also include an accounting module 326 that is configured to enable accounting entries to be established for sessions on the network, the network element, or both.

As depicted in FIG. 3, the network image fusion service module 112 is configured to perform the image fusion service described above with respect to FIGS. 1 and 2. In the illustrated embodiments, a network image fusion service module 112 is coupled to the processor 302 and memory 306. The network image fusion service module 112 includes a programmable reconfigurable logic device 328 and a memory 330. The network image fusion service module 112 may optionally include the storage location 114 of the image fusion process(s) software instructions and hardware logic files. Alternatively, the storage location image 114 of the fusion process(s) software instructions and hardware logic file(s) may be external to the network element 106 and coupled to the network element via one of the ports 308 or via a separate port 332.

Figure 4:
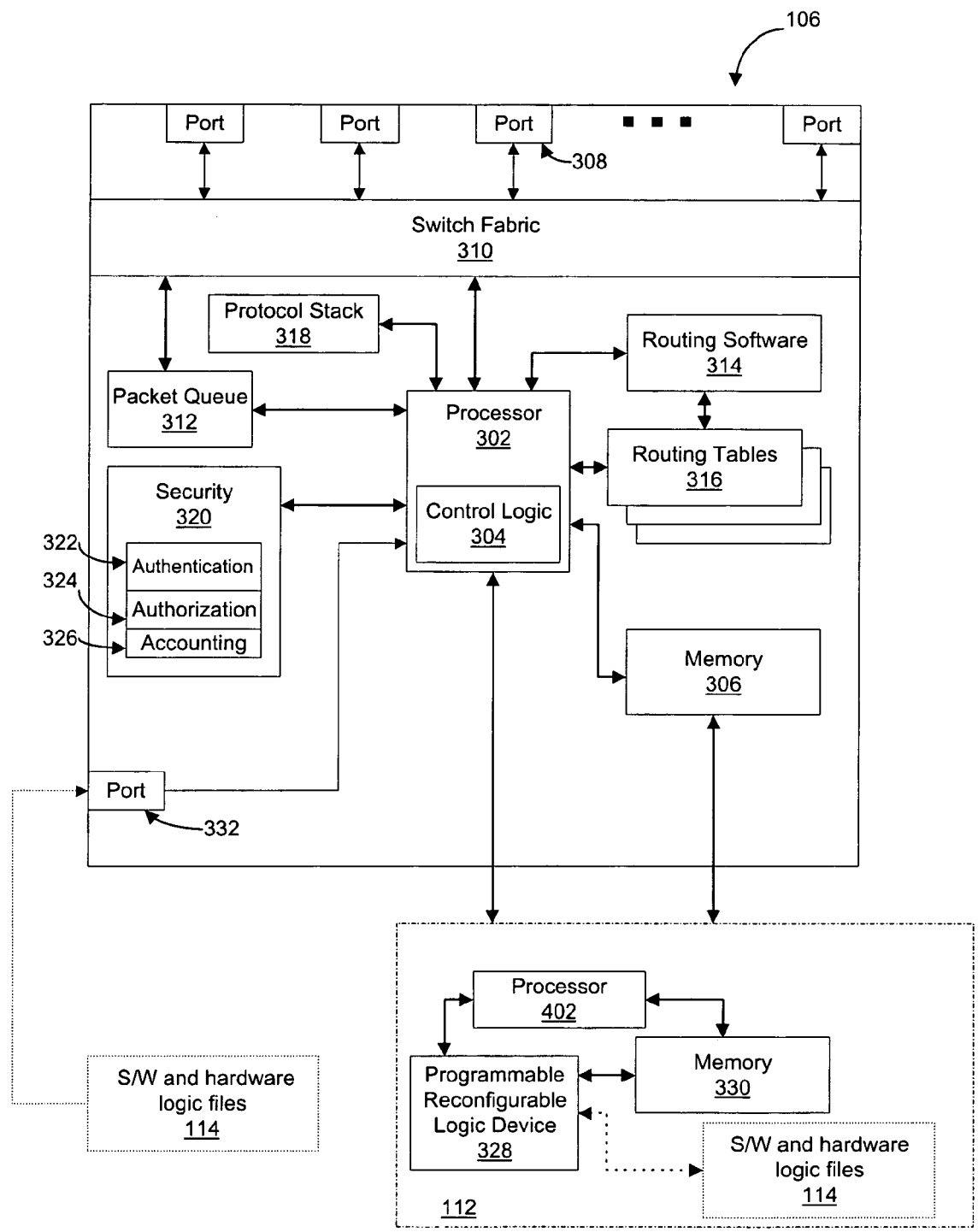
FIG. 4 is a functional block diagram of a network element and associated network service module according to an embodiment of the present invention.

The image fusion service module 112 may be implemented on a network element 106 as illustrated in FIG. 3 or may be implemented on a separate computer platform so that the fusion service module can also be implemented separate from the network element 106 as illustrated in FIG. 4. In the embodiment illustrated in FIG. 4, the image fusion service module 112 includes a processor 402 in addition to the components described above with respect to FIG. 3. In this embodiment, the image fusion service module 112 can be implemented, for example, as a blade server external to the associated network element 106, but coupled thereto to enable the blade server to receive and transmit messages via the network 104 and to make use of the processor and memory and other resources available within the network element 106.

The methods described herein may be implemented as a set of program logic that are stored in a computer readable memory within the network element or accessible thereto, and executed on one or more processors within the network element. However, it will be apparent to a skilled artisan that all logic and methods described herein can be embodied using discrete components, integrated circuitry such as an ASIC, PLA, PAL, FPGA, or microprocessor, a state machine, or any other device including any combination thereof. Programmable logic can be fixed temporarily or permanently in a tangible medium such as one of the variety of read-only memory (ROM) chips, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be appreciated that other variations to and modifications of the above-described method and system for transferring and compressing medical image data may be made without departing from the inventive concepts described herein. Accordingly, the invention should not be viewed as limited except by the scope and spirit of the appended claims.

What is claimed is

1. A method for combining a plurality of previously stored medical images to form a human readable fused medical image for presentation to a human viewer, the method comprising the steps of:

receiving the plurality of previously stored medical images at a network service from a data storage source where the data had been stored after having been previously generated by a medical imaging modality;

retrieving, by the network service, software codes and hardware logic files to enable the network service to implement an image fusion process to form the human readable fused medical image from the plurality of previously stored medical images, the software codes containing software instructions for execution on a processor and the hardware logic files describing hardware logic to be used to reconfigure and reprogram a Field Programmable Gate Array (FPGA);

configuring, by the network service the FPGA using the hardware logic files to reconfigure and reprogram the FPGA to implement at least a part of the image fusion process;

executing, by the network service, the image fusion process software instructions in the processor and using the FPGA that has been reconfigured and reprogrammed using the hardware logic files to form the human readable fused image from the plurality of previously stored medical images; and providing, by the network service as an output, the human readable fused image.

2. The method of claim 1, wherein the step of receiving the data representative of an image includes:

receiving a request, by the network service, for the creation of the fused images; and requesting by the network service the plurality of previously stored medical images from the data storage source where the data had previously been stored.

3. The method of claim 2, wherein data storage source is a medical image archive system.

4. A network service deployable on a communication network to implement a method of combining a plurality of previously stored medical images to form a human readable fused medical image for presentation to a human viewer, comprising:

a processor for execution of software logic;

a Field Programmable Gate Array reconfigurable using hardware logic files; and a computer-readable medium capable of being loaded to store software codes and hardware logic files which, when executed, are configured to:

receive the plurality of previously stored medical images from a data storage source where the plurality of previously stored medical images had been stored after having been previously generated by a medical imaging modality;

retrieve software codes and hardware logic files to enable the network service to implement an image fusion process to form the human readable fused medical image from the plurality of previously stored medical images, the software codes containing software instructions for execution on a processor and the hardware logic files describing hardware logic to be used to reconfigure and reprogram a Field Programmable Gate Array (FPGA);

configure the FPGA using the hardware logic files to reconfigure and reprogram the FPGA to implement at least a part of the image fusion process;

execute the software code in the process in conjunction with the reconfigured and reprogrammed FPGA, to form a human readable fused medical image from the plurality of previously stored medical images; and provide, as an output, the human readable fused medical image.

5. The system of claim 4, wherein the network processor directs the configuration of the FPGA and execution of the hardware logic by the FPGA.

* * * * *